United States Patent
Fakoorian et al.

(10) Patent No.: US 10,680,682 B2
(45) Date of Patent: Jun. 9, 2020

(54) CHANNEL STATE INFORMATION FEEDBACK FOR MULTI-TRANSMISSION/RECEPTION POINT TRANSMISSION IN NEW RADIO

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Srinivas Yerramalli, San Diego, CA (US); Arumugam Chendamarai Kannan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/406,688

(22) Filed: May 8, 2019

(65) Prior Publication Data

US 2019/0349033 A1    Nov. 14, 2019

Related U.S. Application Data

(60) Provisional application No. 62/670,445, filed on May 11, 2018.

(51) Int. Cl.
*H04K 1/10* (2006.01)
*H04L 27/28* (2006.01)
(Continued)

(52) U.S. Cl.
CPC ......... *H04B 7/0417* (2013.01); *H04B 7/0486* (2013.01); *H04B 7/0626* (2013.01)

(58) Field of Classification Search
CPC .. H04B 7/0417; H04B 7/0486; H04B 7/0626; H04B 7/024; H04W 24/08
(Continued)

(56) References Cited

U.S. PATENT DOCUMENTS

2013/0303230 A1* 11/2013 Sayana ............... H04W 24/08
                                                        455/524
2017/0134082 A1    5/2017 Onggosanusi et al.
2018/0042028 A1*  2/2018 Nam ..................... H04B 7/024

FOREIGN PATENT DOCUMENTS

WO    2013023290 A1    2/2013
WO    2018028182 A1    2/2018

OTHER PUBLICATIONS

International Search Report and Written Opinion—PCT/US2019/031539—ISA/EPO—dated Jul. 25, 2019.

* cited by examiner

*Primary Examiner* — Phuong Phu
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine, based at least in part on a set of channel state information reference signals (CSI-RSs), a plurality of hypotheses associated with a plurality of transmission/reception points (TRPs), wherein the UE is configured to receive non-coherent transmissions across the plurality of TRPs according to at least one of a transparent transmit diversity scheme, a non-transparent transmit diversity scheme, or a closed-loop block diagonal precoder scheme, and wherein a coherent precoder is configured within each of the plurality of TRPs. In some aspects, the UE may determine, based at least in part on the plurality of hypotheses, channel state information (CSI) feedback associated with the plurality of TRPs. Numerous other aspects are provided.

30 Claims, 9 Drawing Sheets

(51) Int. Cl.
*H04B 7/0417* (2017.01)
*H04B 7/0456* (2017.01)
*H04B 7/06* (2006.01)

(58) Field of Classification Search
USPC .................. 375/260, 346, 267, 299, 347
See application file for complete search history.

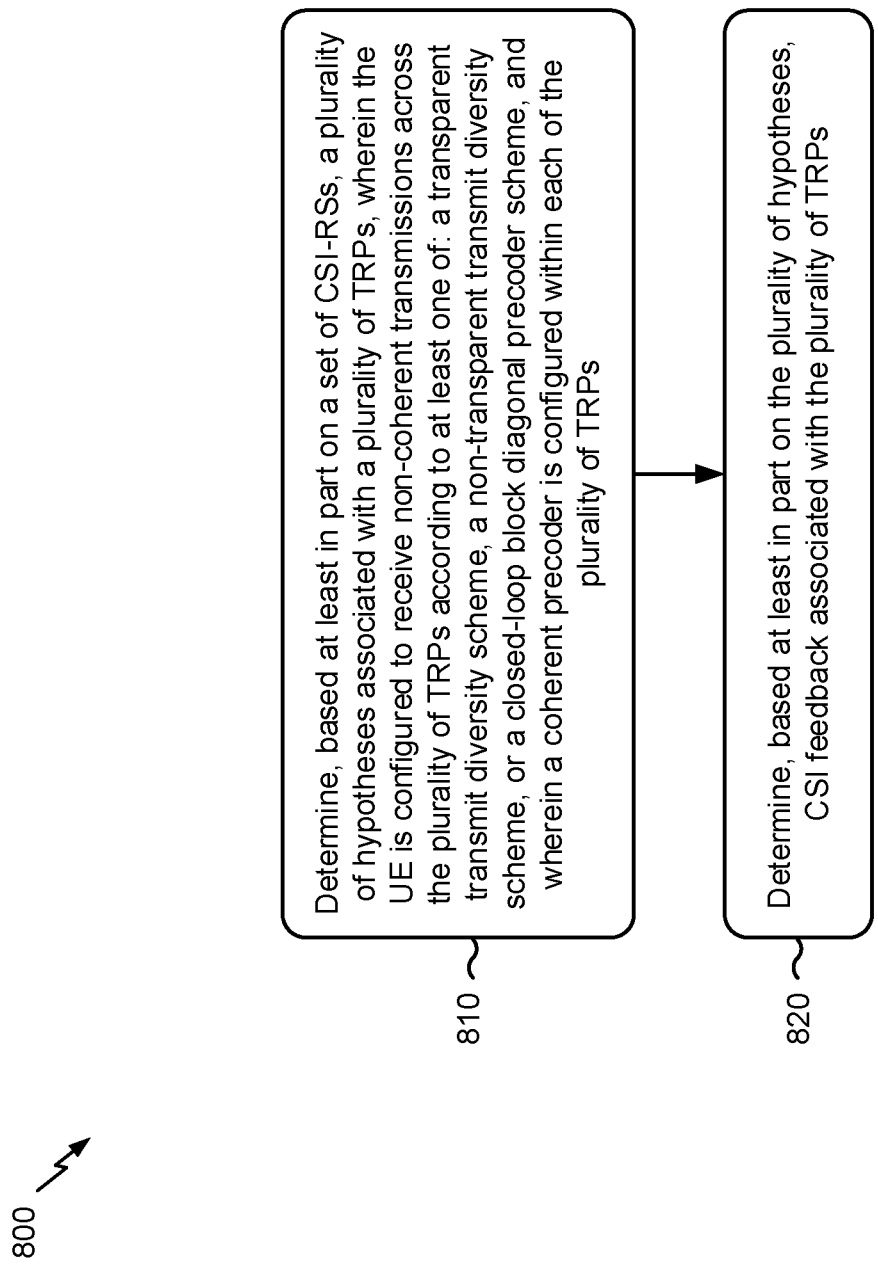

CHANNEL STATE INFORMATION FEEDBACK FOR MULTI-TRANSMISSION/RECEPTION POINT TRANSMISSION IN NEW RADIO

CROSS REFERENCE TO RELATED APPLICATION UNDER 35 U.S.C § 119

This application claims priority to U.S. Provisional Application No. 62/670,445, filed on May 11, 2018, entitled "TECHNIQUES AND APPARATUSES FOR CHANNEL STATE INFORMATION FEEDBACK FOR MULTI-TRANSMISSION/RECEPTION POINT TRANSMISSION IN NEW RADIO," which is hereby expressly incorporated by reference herein.

FIELD OF THE DISCLOSURE

Aspects of the present disclosure generally relate to wireless communication, and more particularly to techniques and apparatuses for channel state information (CSI) feedback for multi-transmission/reception point (TRP) transmission in New Radio (NR).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmission/reception point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining, based at least in part on a set of channel state information reference signals (CSI-RSs), a plurality of hypotheses associated with a plurality of transmission/reception points (TRPs), wherein the UE is configured to receive non-coherent transmissions across the plurality of TRPs according to at least one of: a transparent transmit diversity scheme, a non-transparent transmit diversity scheme, or a closed-loop block diagonal precoder scheme, and wherein a coherent precoder is configured within each of the plurality of TRPs; and determining, based at least in part on the plurality of hypotheses, channel state information (CSI) feedback associated with the plurality of TRPs.

In some aspects, a UE for wireless communication may include memory and one or more processors operatively coupled to the memory. The memory and the one or more processors may be configured to determine, based at least in part on a set of CSI-RSs, a plurality of hypotheses associated with a plurality of TRPs, wherein the UE is configured to receive non-coherent transmissions across the plurality of TRPs according to at least one of: a transparent transmit diversity scheme, a non-transparent transmit diversity scheme, or a closed-loop block diagonal precoder scheme, and wherein a coherent precoder is configured within each of the plurality of TRPs; and determine, based at least in part on the plurality of hypotheses, CSI feedback associated with the plurality of TRPs.

In some aspects, a non-transitory computer-readable medium may store one or more instructions for wireless communication. The one or more instructions, when executed by one or more processors of a UE, may cause the one or more processors to determine, based at least in part on a set of CSI-RSs, a plurality of hypotheses associated with a plurality of TRPs, wherein the UE is configured to receive non-coherent transmissions across the plurality of TRPs according to at least one of: a transparent transmit diversity scheme, a non-transparent transmit diversity scheme, or a closed-loop block diagonal precoder scheme, and wherein a coherent precoder is configured within each of the plurality of TRPs; and determine, based at least in part on the plurality of hypotheses, CSI feedback associated with the plurality of TRPs.

In some aspects, an apparatus for wireless communication may include means for determining, based at least in part on a set of CSI-RSs, a plurality of hypotheses associated with a plurality of TRPs, wherein the apparatus is configured to receive non-coherent transmissions across the plurality of TRPs according to at least one of: a transparent transmit diversity scheme, a non-transparent transmit diversity scheme, or a closed-loop block diagonal precoder scheme, and wherein a coherent precoder is configured within each of the plurality of TRPs; and means for determining, based at least in part on the plurality of hypotheses, CSI feedback associated with the plurality of TRPs.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
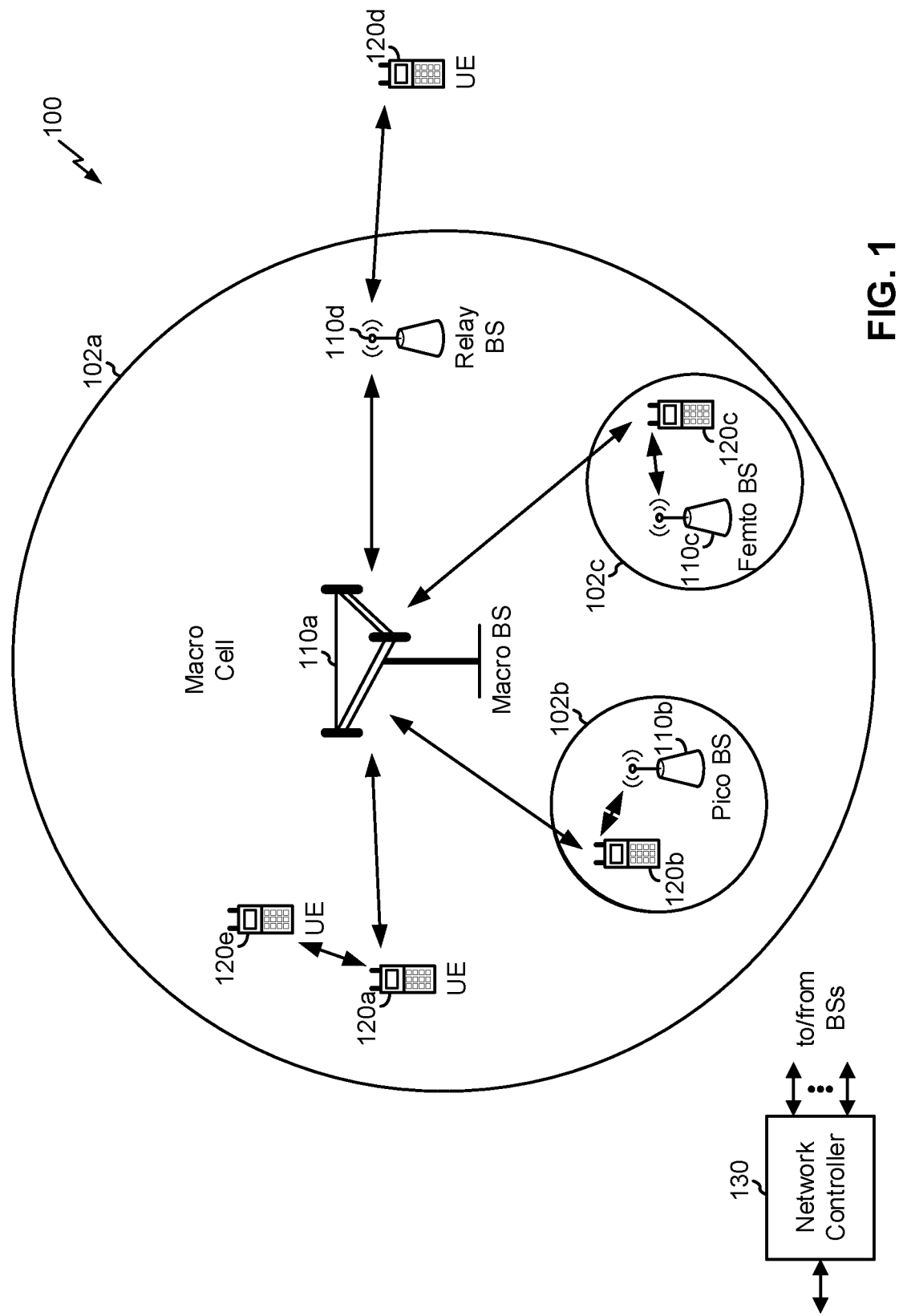
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
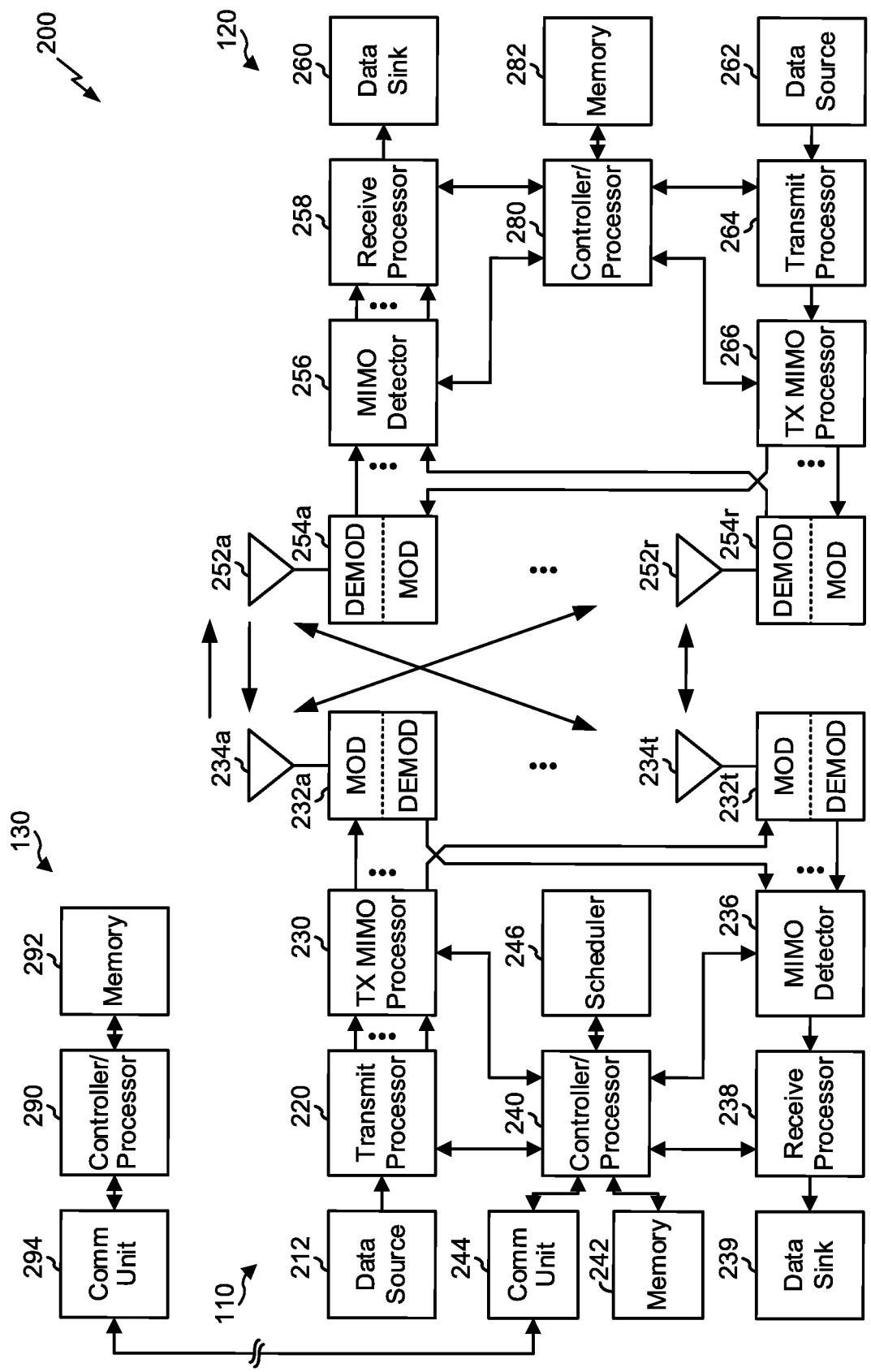
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with CSI feedback for multi-TRP transmission in NR, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining, based at least in part on a set of CSI-RSs, a plurality of hypotheses associated with a plurality of TRPs, wherein the UE is configured to receive non-coherent transmissions across the plurality of TRPs according to at least one of: a transparent transmit diversity scheme, a non-transparent transmit diversity scheme, or a closed-loop block diagonal precoder scheme, and wherein a coherent precoder is configured within each of the plurality of TRPs; means for determining, based at least in part on the plurality of hypotheses, CSI feedback associated with the plurality of TRPs; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
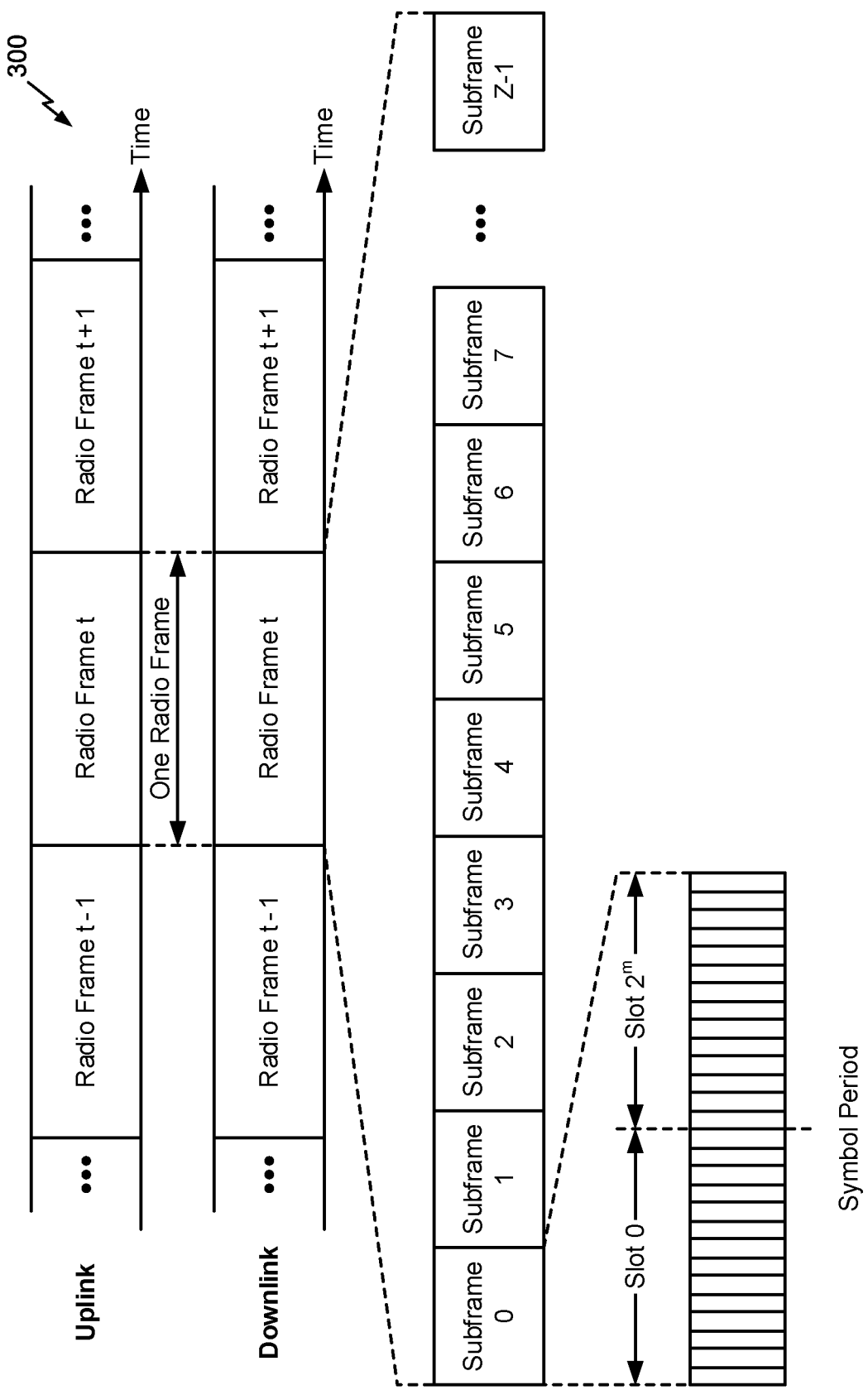
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
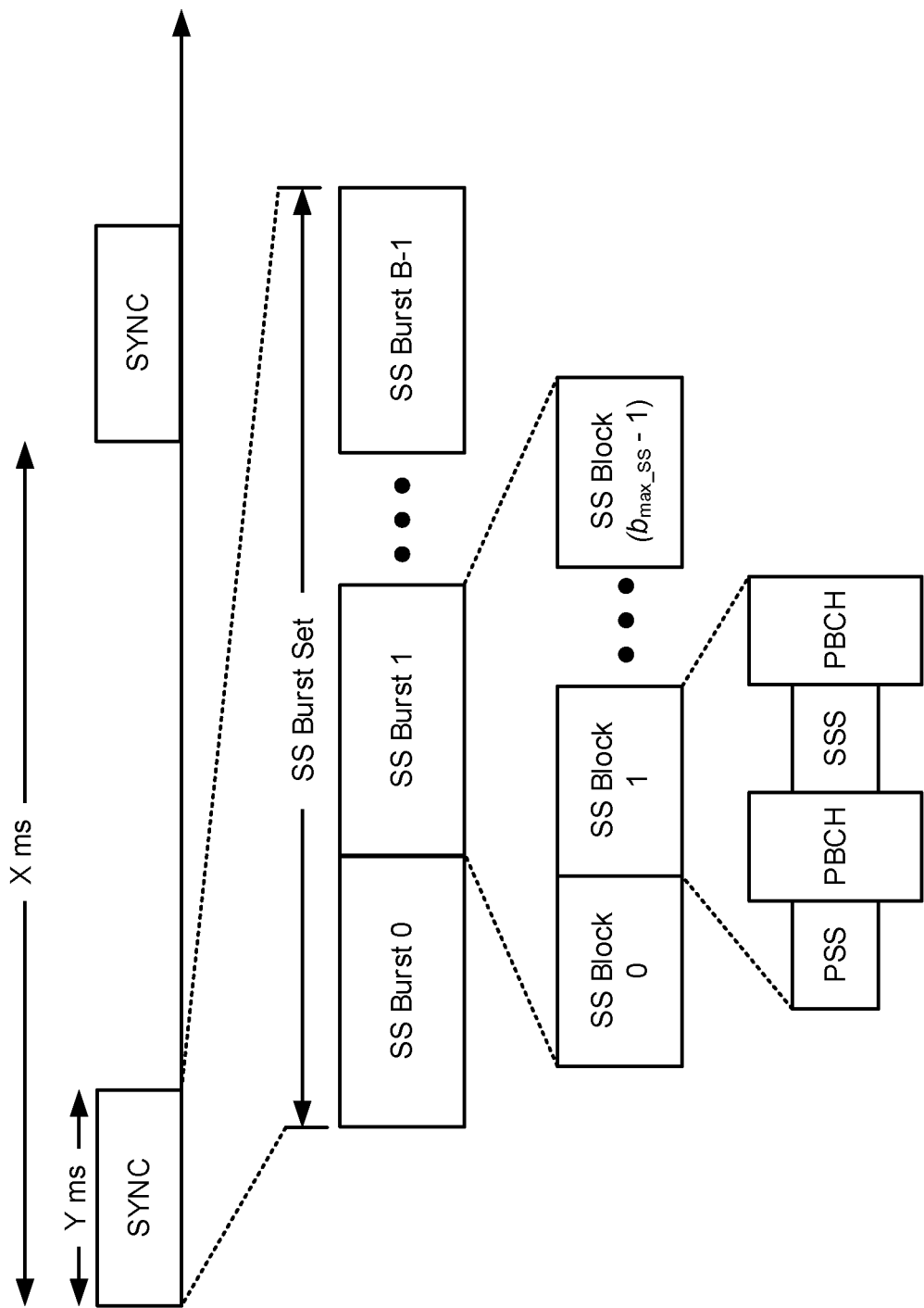
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
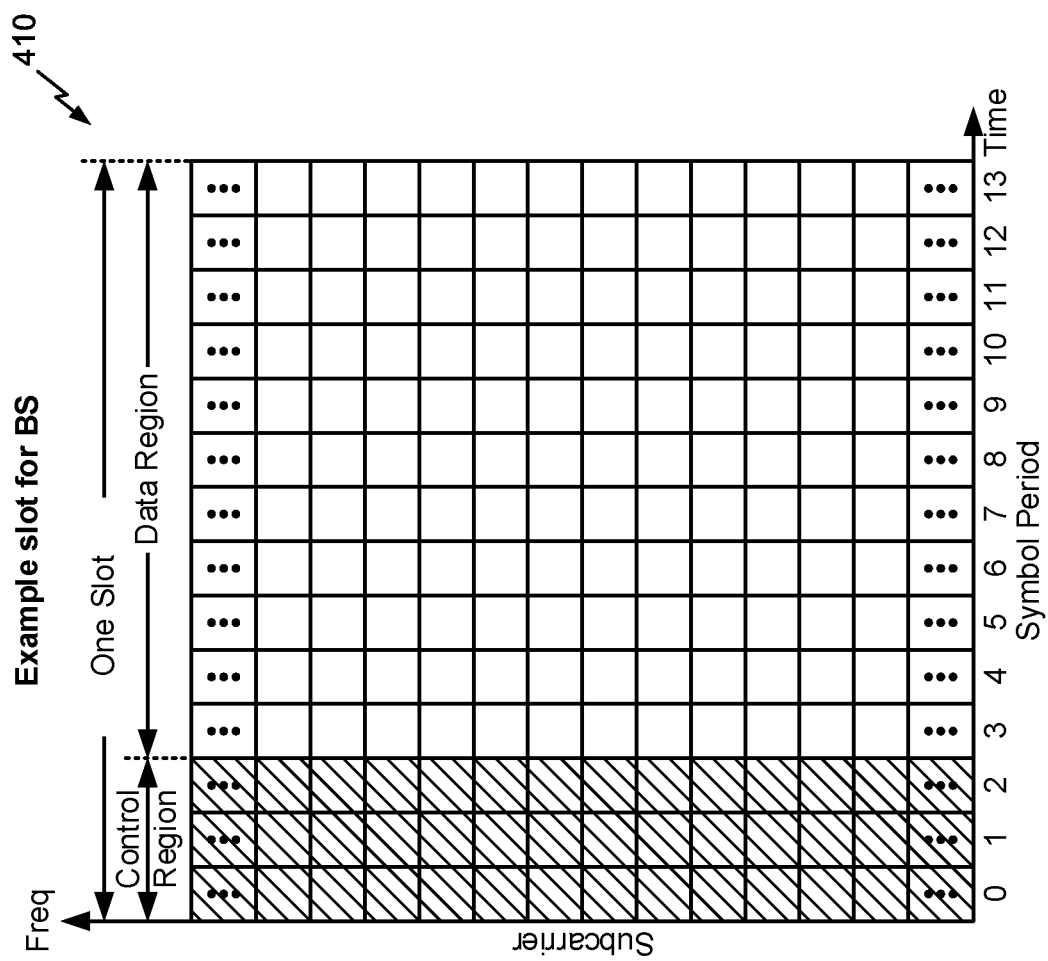
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
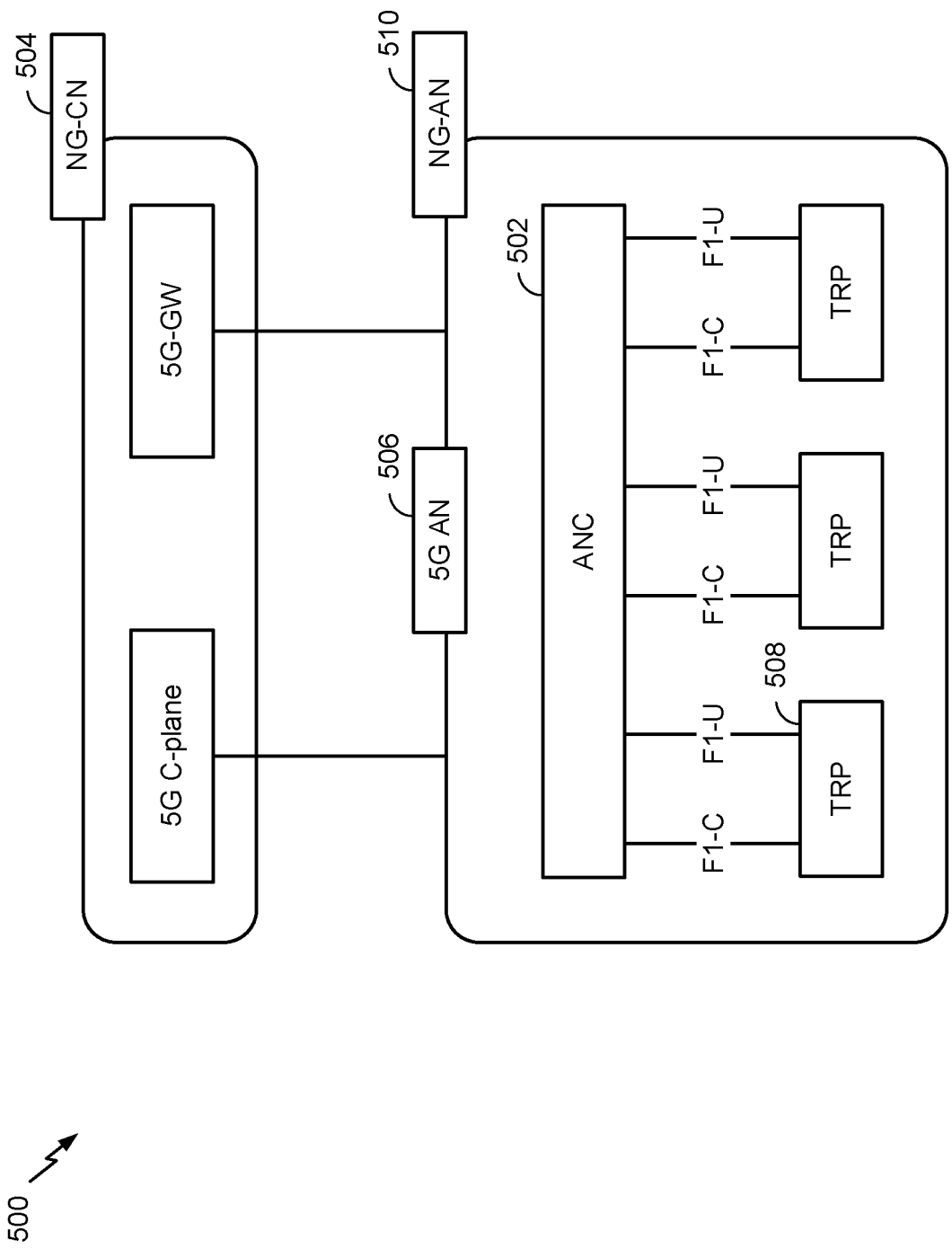
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
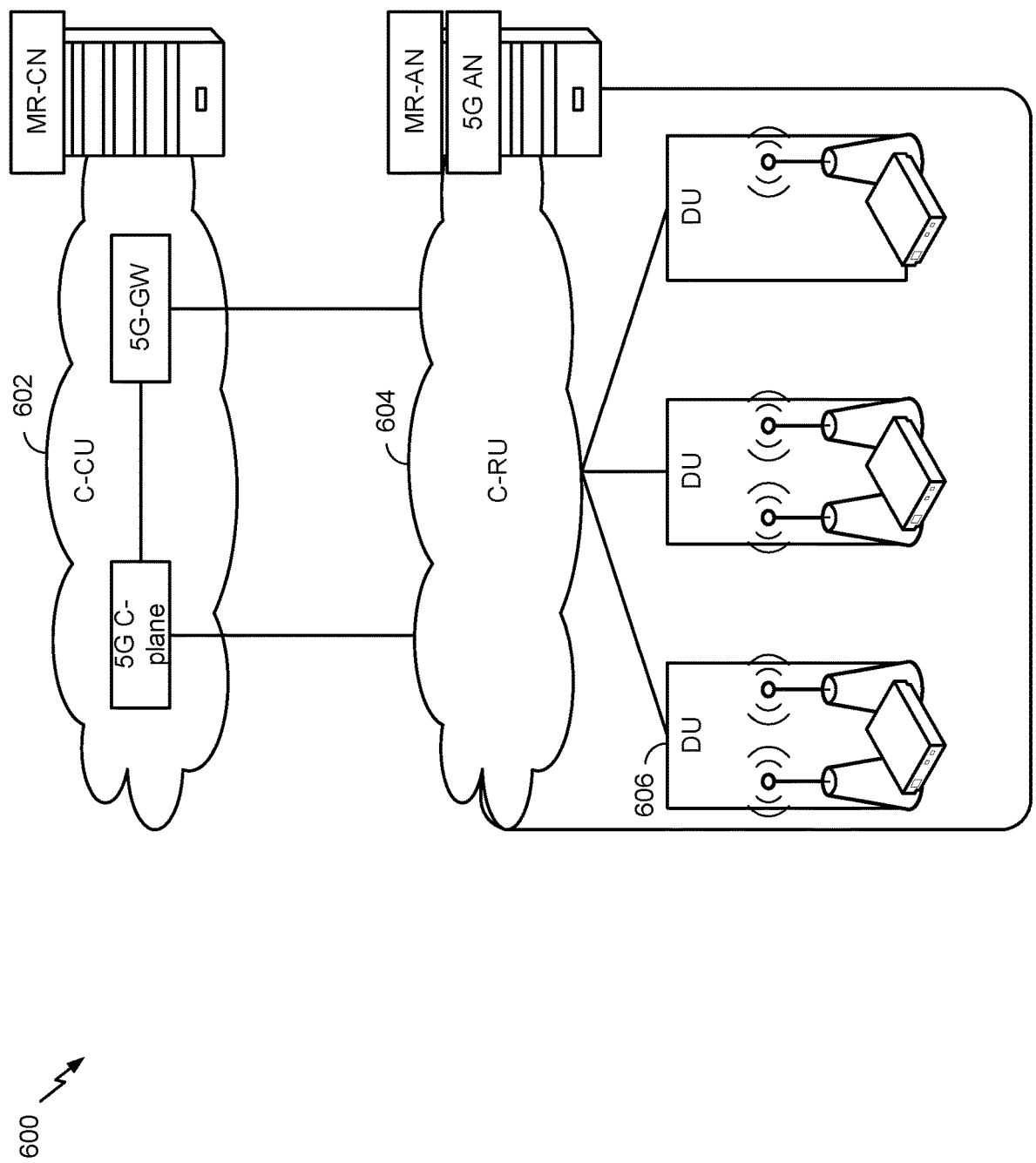
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In a wireless network, such as a NR network, a UE may be capable of receiving downlink communications transmitted by multiple transmission/reception points (TRPs) (e.g., in a same set of resources or in different sets of resources). For example, the UE may receive a single PDSCH communication (e.g., a joint PDSCH communication) from two TRPs, where a first group of layers of the PDSCH communication are transmitted by a first TRP, while a second group of layers of the PDSCH communication are transmitted by a second TRP. In this example, the PDSCH communication may be scheduled via a PDCCH communication transmitted by either of the TRPs. As another example, the UE may receive a first PDSCH communication from the first TRP, and may receive a second PDSCH communication from the second TRP. In this example, the PDSCH communications may be scheduled using one or two PDCCH communications transmitted by either of the TRPs. The use of such a multi-TRP scheme may improve reliability at the UE (by increasing diversity), may improve a data rate at the UE (by increasing transmission rank at the UE), and/or the like.

For such multi-TRP transmissions, coherent joint transmission may be achieved across some TRPs in some cases. A coherent joint transmission may be achieved when phase synchronization across a group of TRPs is possible (e.g., when the TRPs are driven by a same clock, when antenna ports, associated with the group of TRPs, are quasi co-located, and/or the like), thereby allowing a joint precoder design to be used by the group of TRPs. In such cases, the group of TRPs may be considered as a single (e.g., virtual) TRP within which a coherent precoder is configured.

However, phase synchronization across TRPs is not readily achievable in practice (e.g., when the TRPs are driven by different clocks, when antenna ports of the group of TRPs are not quasi co-located, and/or the like). Thus, a non-coherent joint transmission may be used when phase synchronization between different TRPs cannot be achieved or is not readily achievable. For non-coherent joint transmissions, separate precoder designs need to be used at each of the groups of TRPs. In other words, without phase synchronization, a precoder has to be configured individually within each TRP (e.g., a single TRP or a virtual TRP including a group of TRPs for which phase synchronization can be achieved), meaning that each TRP operates individually with regard to precoder design.

The determination and reporting of channel state information (CSI) feedback by the UE needs to be defined in multi-TRP scenarios when non-coherent joint transmissions are used. The CSI feedback may be used by a TRP when selecting a precoder. When determining the CSI feedback, the UE needs to consider scenarios in which per-TRP CSI feedback (that takes into account inter-TRP interference) is needed (e.g., for a case in which only a single TRP would be transmitting to the UE), as well as scenarios in which joint CSI feedback is needed (e.g., for a case in which multiple TRPs would be jointly transmitting to the UE). In this sense, the UE needs to consider multiple channel hypotheses, meaning that multiple reporting parameters are needed in one CSI report setting.

Notably, precoder selection within a given TRP based on a sounding reference signal (SRS) is not suitable in a multi-TRP scenario with non-coherent joint transmissions.

The problem with using an SRS is that when the SRS is transmitted by a UE, only TRPs associated with the UE will receive the SRS. Here, a given TRP would need to listen to SRSs from other UEs that are not associated with the TRP. This problem is not present when CSI feedback, provided by the UE, is used for precoder selection.

Some implementations described herein provide techniques and apparatuses for determining CSI feedback in the case of non-coherent transmissions across multiple TRPs (each configured with a coherent precoder) when the UE is to receive non-coherent transmissions according to one of a variety of transmit diversity schemes (e.g., a transparent transmit diversity scheme, a non-transparent transmit diversity scheme, or a closed-loop block diagonal precoder scheme).

In some aspects, a UE may determine, based at least in part on a set of CSI reference signals (CSI-RSs), a plurality of hypotheses associated with the multiple TRPs; may determine, based at least in part on the plurality of hypotheses, CSI feedback associated with the plurality of TRPs; and may provide the CSI feedback, accordingly, as described below.

Figure 7:
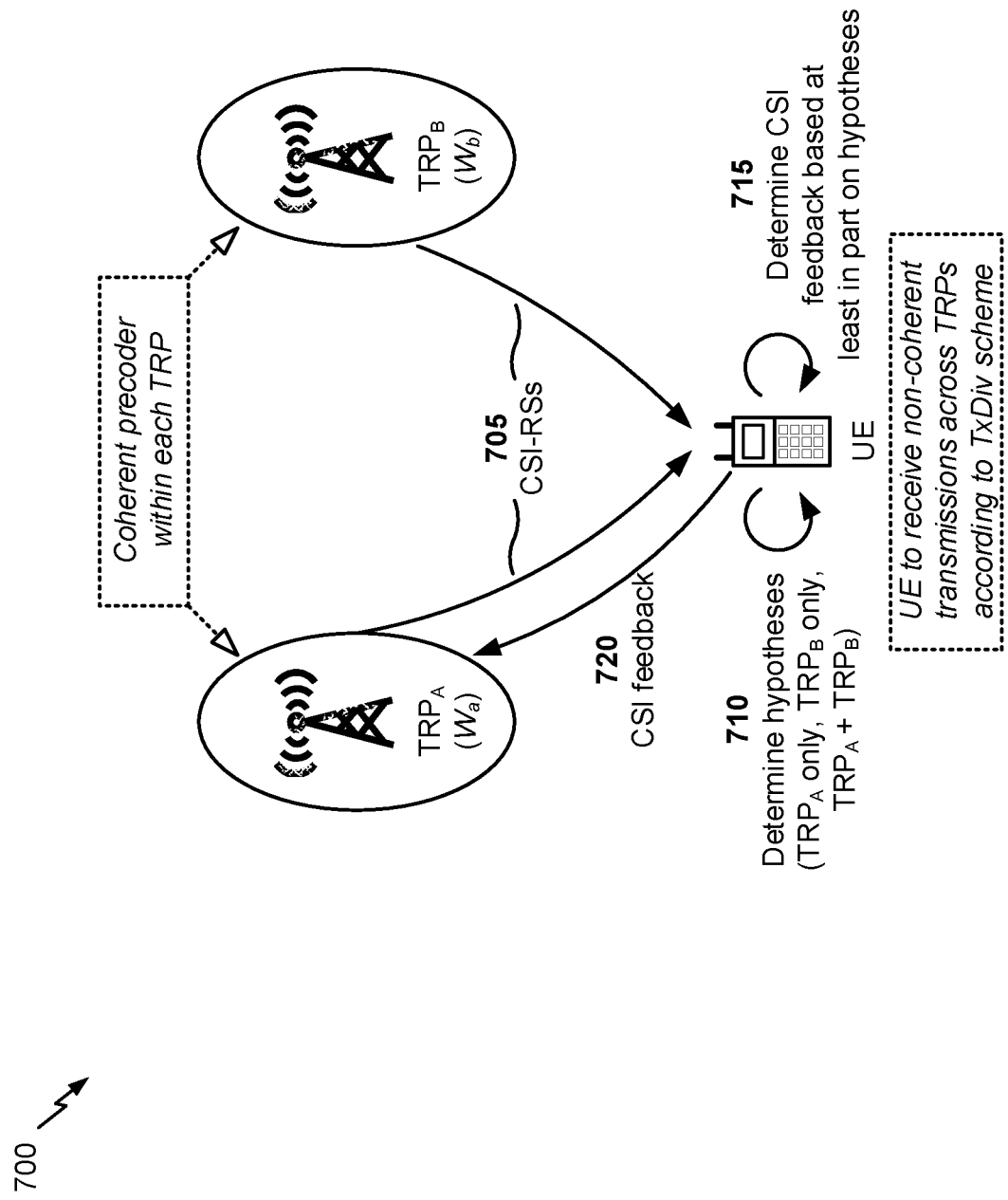
FIG. 7 is a diagram illustrating an example of determining CSI feedback in the case of non-coherent transmissions across multiple TRPs, each configured with a coherent precoder, when the UE is to receive non-coherent transmissions according to one of a variety of transmit diversity schemes, in accordance with various aspects of the present disclosure.

FIG. 7 is a diagram illustrating an example 700 of determining CSI feedback in the case of non-coherent transmissions across a multiple TRPs, each configured with a coherent precoder, when the UE is to receive non-coherent transmissions according to one of a variety of transmit diversity schemes, in accordance with various aspects of the present disclosure.

As noted in FIG. 7, a UE (e.g., UE 120) may be configured to receive non-coherent transmissions across a plurality of TRPs (e.g., $TRP_A$ and $TRP_B$, which may be TRPs 508 configured on one or more base stations 110) according to a particular transmit diversity (TxDiv) scheme, where a coherent precoder is configured within each TRP (e.g., $W_a$ within $TRP_A$ and $W_b$ within $TRP_B$). While two TRPs are shown in FIG. 7, in practice, there may be greater than two TRPs.

As shown by reference numbers 705 and 710, the UE may receive a set of CSI-RSs transmitted by $TRP_A$ and $TRP_B$. In some aspects, the set of CSI-RSs may include a CSI-RS transmitted (e.g., in a first set of resources) by $TRP_A$ and a CSI-RS transmitted (e.g., in a second set of resources) by $TRP_B$. Additionally, in some aspects, the set of CSI-RSs may include a joint CSI-RS that is transmitted (e.g., in a third set of resources) by both $TRP_A$ and $TRP_B$ (e.g., at a same time). In some aspects, the UE may determine a plurality of hypotheses based at least in part on the set of CSI-RSs, as described below. In some aspects, the UE may be configured with information that identifies the respective set of resources in which the UE is to receive each CSI-RS of the set of CSI-RSs.

As shown by reference number 710, the UE may determine, based at least in part on the set of CSI-RSs, a plurality of hypotheses associated with the plurality of TRPs. In some aspects, a hypothesis is associated with a state of a channel between the UE and one or more of the plurality of TRPs. For example, the plurality of hypotheses may include a hypothesis associated with a channel between the UE and a single TRP of the plurality of TRPs (e.g., a hypothesis associated with a state of a channel between the UE and $TRP_A$ only, a hypothesis associated with a state of a channel between the UE and $TRP_B$ only).

As another example, the plurality of hypotheses may include a hypothesis associated with a channel between the UE and multiple TRPs when the channel is used for a joint transmission of the same information (e.g., a same set of symbols) by the multiple TRPs. As a particular example, the hypothesis may be a hypothesis associated with a channel between the UE and $TRP_A$ and $TRP_B$ when the channel is used for a joint transmission of the same set of symbols (e.g., a same PDSCH communication) by both $TRP_A$ and $TRP_B$. In such a case, the UE may determine CSI feedback, associated with the hypothesis associated with the joint transmission of the same information, that includes a single rank indicator (RI) from a set of rank indicators (e.g., RI={1}, {2}, {3}, {4}, {5}, {6}, {7}, {8}) that is associated with each of the plurality of TRPs. In other words, the single rank indicator may correspond to a rank for the plurality of TRPs when the plurality of TRPs are to jointly transmit the same information. In some aspects, the selection of the rank indicator by the UE may be limited based at least in part on a type of the joint transmission. For example, when the UE is to receive URLLC data, the selection of the rank indicator may be limited to a subset of the set of rank indicators (e.g., selection may be limited to {1}-{4} from the set of {1}-{8}) in order to ensure reliability of the joint transmission. In some aspects, the UE may determine such a hypothesis based at least in part on an indication that a transmission of a same transport block (TB) across the plurality of TRPs is supported. In some aspects, transmission of the same TB across the plurality of TRPs allows the UE to combine LLR across the plurality of TRPs when determining the CSI feedback.

As another example, the plurality of hypotheses may include a hypothesis associated with a channel between the UE and multiple TRPs when the channel is used for a joint transmission of different information (e.g., different sets of symbols) by the multiple TRPs. As a particular example, the hypothesis may be a hypothesis associated with a channel between the UE and $TRP_A$ and $TRP_B$ when the channel is used for a joint transmission of different set of symbols (e.g., different PDSCH communications, different layers of a particular PDSCH communication) by both $TRP_A$ and $TRP_B$.

In some aspects, the UE may determine multiple hypotheses. For example, the UE may include a first hypothesis associated with $TRP_A$ only, a second hypothesis associated with $TRP_B$ only, a third hypothesis associated with both $TRP_A$ and $TRP_B$ for a joint transmission of the same information by $TRP_A$ and $TRP_B$, and a fourth hypothesis associated with both $TRP_A$ and $TRP_B$ for a joint transmission of different information by $TRP_A$ and $TRP_B$.

In some aspects, the UE may be configured to select either the hypothesis associated with the joint transmission of the same information or the hypothesis associated with the joint transmission of different information for determination of the CSI feedback. For example, the UE may select the hypothesis with a comparatively higher capacity, and may determine the CSI feedback based at least in part on the selected hypothesis, accordingly.

In some aspects, the UE may determine at least two hypotheses, of the plurality of hypotheses, based at least in part on a CSI-RS of the set of CSI-RSs. For example, the UE may determine a first hypothesis associated with a channel between the UE and $TRP_A$ based at least in part on a CSI-RS transmitted by $TRP_A$, and may determine a second hypothesis associated with a channel between the UE and $TRP_B$ based at least in part on a CSI-RS transmitted by $TRP_B$. In this example, the UE may determine one or more hypotheses associated with a channel between the UE and $TRP_A$ and $TRP_B$ based at least in part on the CSI-RS transmitted by $TRP_A$ and based at least in part on the CSI-RS transmitted by $TRP_B$. In other words, the UE may reuse at least one of the set of CSI-RSs when determining the plurality of hypotheses, in some aspects.

In some aspects, the UE may determine the plurality of hypotheses based at least in part on different CSI-RSs of the set of CSI-RSs. For example, the UE may determine a first hypothesis associated with a channel between the UE and $TRP_A$ based at least in part on a CSI-RS transmitted by $TRP_A$, may determine a second hypothesis associated with a channel between the UE and $TRP_B$ based at least in part on a CSI-RS transmitted by $TRP_B$, and may determine one or more hypotheses associated with a channel between the UE and $TRP_A$ and $TRP_B$ based at least in part on a joint CSI-RS transmitted by both $TRP_A$ and $TRP_B$.

As further shown in FIG. 7, and by reference number 715, the UE may determine CSI feedback based at least in part on the plurality of hypotheses. For example, the UE may determine first CSI feedback based at least in part on a hypothesis associated with a channel for a $TRP_A$-only transmission, second CSI feedback based at least in part on a hypothesis associated with a channel for a $TRP_B$-only transmission, third CSI feedback based at least in part on a hypothesis associated with a channel for a joint transmission of different information by $TRP_A$ and $TRP_B$, and a fourth CSI feedback based at least in part on a hypothesis associated with a channel for a joint transmission of the same information by $TRP_A$ and $TRP_B$.

In some aspects, the CSI feedback may include a plurality of channel quality indicators (CQIs) corresponding to the plurality of hypotheses, a plurality of precoding matrix indicators (PMIs) corresponding to the plurality of hypotheses, a plurality of rank indicators (RIs) corresponding to the plurality of hypotheses, and/or another type of information that is to be reported by the UE. In some aspects, the type of information included in the CSI feedback may depend on a transmit diversity scheme according to which the UE is configured to receive non-coherent transmissions across the plurality of TRPs.

In some aspects, as noted above, the UE may be configured to receive non-coherent transmissions across the plurality of TRPs according to one of a variety of transmit diversity schemes, such as a transparent transmit diversity scheme, a non-transparent transmit diversity scheme, or a closed-loop block diagonal precoder scheme.

The transparent transmit diversity scheme is a scheme in which a precoder, to be applied by each TRP, is transparent to the UE (i.e., such that the UE is not informed of the precoder). For example, in some aspects, the transparent transmit diversity scheme may be a scheme that uses small delay cyclic delay diversity (CDD) across the plurality of TRPs, where the UE is not informed of a delay across different TRPs. As another example, the transparent transmit diversity scheme may be a scheme that uses precoder cycling across the plurality of TRPs, where the UE is not informed of a precoder used on a given set of resources (e.g., a given resource block group (RBG)), but where the precoder used on a given set of resources is consistent across the plurality of TRPs.

In some aspects, when the transparent transmit diversity scheme is used, the transparent precoding may be applied to a given CSI-RS before transmission by an associated TRP. In such a case, the transparent precoding is resolved in the channel and, thus, the UE need not be informed of the transparent precoding.

Alternatively, in some aspects, transparent precoding may not be applied to the given CSI-RS before transmission by the associated TRP. In this case, the UE may be configured to receive information associated with the transparent precoding (e.g., information that identifies a cyclic delay, information associated with an RBG precoder, and/or the like, that will be applied to a given TRP transmission) based at least in part on the transparent precoding not being applied to the CSI-RS (e.g., such that the UE may determine the CSI feedback appropriately). Thus, in this example, even though transparent precoding may be used for a given TRP transmission, the precoding is not transparent to CSI feedback. Here, since the CSI feedback may be sensitive to the cyclic delay or the precoder choice selected by the TRP, explicit signaling of information associated with the transparent precoding may result in more accurate CSI feedback.

The non-transparent transmit diversity scheme is a scheme in which a precoder, to be applied by each TRP, is not transparent to the UE (i.e., such that the UE is informed of the precoder). For example, in some aspects, the non-transparent transmit diversity scheme may be a scheme that uses space-frequency block code (SFBC) across the plurality of TRPs. As another example, in some aspects, the non-transparent transmit diversity scheme may be a scheme that uses space-time block code (STBC) across the plurality of TRPs. As another example, in some aspects, the non-transparent transmit diversity scheme may be a scheme that uses large delay CDD across the plurality of TRPs. In some aspects, the large delay CDD may be applied to a case in which different TBs are transmitted by multiple TRPs (e.g., such that a first TB is transmitted from $TRP_A$ and a second TB is transmitted from $TRP_B$ on a first set of resources, while the first TB is transmitted from $TRP_B$ and the second TB is transmitted from $TRP_A$ on a second set of resources).

In some aspects, when the UE is to receive non-coherent transmissions across the plurality of TRPs according to the non-transparent transmit diversity scheme, the UE may determine CSI feedback that identifies a plurality of ranks (e.g., a plurality of RIs) and a plurality of precoders (e.g., a plurality of PMIs that identify, for example, a $W_a$ selected by the UE and a $W_b$ selected by the UE). Here, each rank is associated with a respective hypothesis of the plurality of hypotheses, and each precoder is associated with a respective hypothesis of the plurality of hypotheses.

The closed-loop block diagonal precoder scheme is a scheme in which a block diagonal precoder is applied across the plurality of TRPs, where the UE provides CSI feedback identifying a suggested block diagonal precoder. Thus, according to such a scheme, the CSI feedback, determined by the UE, identifies a suggested block diagonal precoder for application across the plurality of TRPs (e.g., in addition to identifying a plurality of ranks and/or a plurality of precoders, as with the non-transparent transmit diversity scheme). In some aspects, the closed-loop block diagonal precoder scheme may use a block diagonal precoder that is based at least in part on a set of precoders, a set of delay diversities, a set of phase shift diversities, and/or the like. In some aspects, the UE may be configured to select the block diagonal precoder from a preconfigured set of precoders, a preconfigured set of delay diversities, a preconfigured set of phase shift diversities, and/or the like. In some aspects, the UE may determine CSI feedback that includes a summed signal plus interference to noise ratio (SINR) across the plurality of TRPs (in addition to information that identifies a selected block diagonal precoder).

As further shown in FIG. 7, and by reference number 720, the UE may provide the CSI feedback to one or more of the plurality of TRPs (e.g., $TRP_A$, $TRP_B$, or $TRP_A$ and $TRP_B$). In some aspects, a TRP may provide information associated with the CSI feedback to another TRP (e.g., $TRP_A$ may provide the CSI feedback to TRP$_B$ when the UE provides the CSI feedback to TRP$_A$ only, TRP$_B$ may provide the CSI feedback to TRP$_A$ when the UE provides the CSI feedback to TRP$_B$ only).

As indicated above, FIG. 7 is provided as an example. Other examples may differ from what is described with respect to FIG. 7.

FIG. 8 is a diagram illustrating an example process 800 performed, for example, by a UE, in accordance with various aspects of the present disclosure. Example process 800 is an example where a UE (e.g., UE 120) communicates with a plurality of TRPs.

As shown in FIG. 8, in some aspects, process 800 may include determining, based at least in part on a set of CSI-RSs, a plurality of hypotheses associated with a plurality of TRPs, wherein the UE is configured to receive non-coherent transmissions across the plurality of TRPs according to at least one of: a transparent transmit diversity scheme, a non-transparent transmit diversity scheme, or a closed-loop block diagonal precoder scheme, and wherein a coherent precoder is configured within each of the plurality of TRPs (block 810). For example, the UE (e.g., using receive processor 258, controller/processor 280, and/or the like) may determine, based at least in part on a set of CSI-RSs, a plurality of hypotheses associated with a plurality of TRPs, wherein the UE is configured to receive non-coherent transmissions across the plurality of TRPs according to at least one of: a transparent transmit diversity scheme, a non-transparent transmit diversity scheme, or a closed-loop block diagonal precoder scheme, and wherein a coherent precoder is configured within each of the plurality of TRPs, as described above.

As shown in FIG. 8, in some aspects, process 800 may include determining, based at least in part on the plurality of hypotheses, CSI feedback associated with the plurality of TRPs (block 820). For example, the UE (e.g., using receive processor 258, controller/processor 280, and/or the like) may determine, based at least in part on the plurality of hypotheses, CSI feedback associated with the plurality of TRPs, as described above.

Process 800 may include additional aspects, such as any single aspect or any combination of aspects described below and/or in connection with one or more other processes described elsewhere herein.

In a first aspect, the CSI feedback is provided to one or more of the plurality of TRPs.

In a second aspect, alone or in combination with the first aspect, the plurality of hypotheses includes a hypothesis associated with a joint transmission in which a same set of symbols is transmitted by each of the plurality of TRPs.

In a third aspect, in combination with the second aspect, the CSI feedback, associated with the hypothesis associated with the joint transmission, includes a single rank indicator that is associated with each of the plurality of TRPs.

In a fourth aspect, in combination with the third aspect, a selection of the rank indicator is limited based at least in part on a type of the joint transmission.

In a fifth aspect, in combination with any one or more of the second through fourth aspects, the hypothesis associated with the joint transmission is generated based at least in part on an indication that a transmission of a same transport block across the plurality of TRPs is supported.

In a sixth aspect, in combination with any one or more of the second through fourth aspects, the plurality of hypotheses further includes a hypothesis associated with a joint transmission in which each of the plurality of TRPs transmits a different set of symbols.

In a seventh aspect, in combination with the sixth aspect, the UE is configured to select either the hypothesis associated with the joint transmission in which the same set of symbols is transmitted by each of the plurality of TRPs, or the hypothesis associated with the joint transmission in which each of the plurality of TRPs transmits a different set of symbols, wherein the CSI feedback is determined based at least in part on the selected hypothesis.

In an eighth aspect, in combination with any one or more of the second through seventh aspects, the plurality of hypotheses further includes a hypothesis associated with a transmission by only a first TRP, of the plurality of TRPs, and a hypothesis associated with a transmission by only a second TRP of the plurality of TRPs.

In a ninth aspect, alone or in combination with any one or more of the first through eighth aspects, at least two hypotheses, of the plurality of hypotheses, are determined based at least in part on a CSI-RS, of the set of CSI-RSs, received from a TRP of the plurality of TRPs.

In a tenth aspect, in combination with the ninth aspect, transparent precoding is applied to the CSI-RS before the CSI-RS is transmitted to the UE by the TRP.

In an eleventh aspect, in combination with the ninth aspect, transparent precoding is not applied to the CSI-RS before the CSI-RS is transmitted to the UE by the TRP.

In a twelfth aspect, in combination with the eleventh aspect, the UE is configured to receive information associated with transparent precoding, to be applied by the TRP, based at least in part on the transparent precoding not being applied to the CSI-RS.

In a thirteenth aspect, alone or in combination with any one or more of the first through twelfth aspects, each of the plurality of hypotheses is determined based at least in part on a different CSI-RS of the set of CSI-RSs.

In a fourteenth aspect, alone or in combination with any one or more of the first through thirteenth aspects, the transparent transmit diversity scheme uses small delay cyclic delay diversity (CDD) across the plurality of TRPs.

In a fifteenth aspect, alone or in combination with any one or more of the first through fourteenth aspects, the transparent transmit diversity scheme uses precoder cycling across the plurality of TRPs.

In a sixteenth aspect, alone or in combination with any one or more of the first through fifteenth aspects, the non-transparent transmit diversity scheme uses space-frequency block code (SFBC) across the plurality of TRPs.

In a seventeenth aspect, alone or in combination with any one or more of the first through sixteenth aspects, the non-transparent transmit diversity scheme uses space-time block code (STBC) across the plurality of TRPs.

In an eighteenth aspect, alone or in combination with any one or more of the first through seventeenth aspects, when the UE is to receive non-coherent transmissions across the plurality of TRPs according to the non-transparent transmit diversity scheme, the CSI feedback identifies a plurality of ranks and a plurality of precoders selected by the UE, wherein each rank, of the plurality of ranks, is associated with a respective hypothesis of the plurality of hypotheses, and wherein each precoder, of the plurality of precoders, is associated with a respective hypothesis of the plurality of hypotheses.

In a nineteenth aspect, alone or in combination with any one or more of the first through eighteenth aspects, the non-transparent transmit diversity scheme uses a large delay cyclic delay diversity (CDD) across the plurality of TRPs.

In a twentieth aspect, in combination with the nineteenth aspect, the non-transparent transmit diversity scheme that uses the large delay CDD is applied when different transport blocks are to be transmitted by the plurality of TRPs.

In a twenty-first aspect, alone or in combination with any one or more of the first through twentieth aspects, a block diagonal precoder, associated with the closed-loop block diagonal precoder scheme, is selected from a preconfigured set of precoders, a preconfigured set of delay diversities, or a preconfigured set of phase shift diversities.

In a twenty-second aspect, alone or in combination with any one or more of the first through twenty-first aspects, when the UE is to receive non-coherent transmissions across the plurality of TRPs according to the closed-loop block diagonal precoder scheme, the CSI feedback includes information that identifies a block diagonal precoder selected by the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining, based at least in part on a set of channel state information reference signals (CSI-RSs), a plurality of hypotheses associated with a plurality of transmission/reception points (TRPs),
      wherein the UE is configured to receive non-coherent transmissions across the plurality of TRPs according to at least one of:
         a transparent transmit diversity scheme,
         a non-transparent transmit diversity scheme, or
         a closed-loop block diagonal precoder scheme,
      wherein a coherent precoder is configured within each of the plurality of TRPs, and
      wherein the UE is configured to receive information associated with transparent precoding, to be applied by a TRP of the plurality of TRPs, based at least in part on transparent precoding not being applied to a CSI-RS of the set of CSI-RSs; and
   determining, based at least in part on the plurality of hypotheses, channel state information (CSI) feedback associated with the plurality of TRPs.

2. The method of claim 1, wherein the CSI feedback is provided to one or more of the plurality of TRPs.

3. The method of claim 1, wherein the plurality of hypotheses includes a hypothesis associated with a joint transmission in which a same set of symbols is transmitted by each of the plurality of TRPs.

4. The method of claim 3, wherein the CSI feedback, associated with the hypothesis associated with the joint transmission, includes a single rank indicator that is associated with each of the plurality of TRPs.

5. The method of claim 4, wherein a selection of the single rank indicator is limited based at least in part on a type of the joint transmission.

6. The method of claim 3, wherein the hypothesis associated with the joint transmission is generated based at least in part on an indication that a transmission of a same transport block across the plurality of TRPs is supported.

7. The method of claim 3, wherein the plurality of hypotheses further includes a hypothesis associated with a joint transmission in which each of the plurality of TRPs transmits a different set of symbols.

8. The method of claim 7, wherein the UE is configured to select either the hypothesis associated with the joint transmission in which the same set of symbols is transmitted by each of the plurality of TRPs, or the hypothesis associated with the joint transmission in which each of the plurality of TRPs transmits a different set of symbols,
   wherein the CSI feedback is determined based at least in part on the selected hypothesis.

9. The method of claim 3, wherein the plurality of hypotheses further includes a hypothesis associated with a transmission by only a first TRP, of the plurality of TRPs, and a hypothesis associated with a transmission by only a second TRP of the plurality of TRPs.

10. The method of claim 1,
wherein at least two hypotheses, of the plurality of hypotheses, are determined based at least in part on the CSI-RS, and
wherein the CSI-RS is received from the TRP.

11. The method of claim 10, wherein the transparent precoding is not applied to the CSI-RS before the CSI-RS is transmitted to the UE by the TRP.

12. The method of claim 1, wherein each of the plurality of hypotheses is determined based at least in part on a different CSI-RS of the set of CSI-RSs.

13. The method of claim 12, wherein the transparent transmit diversity scheme uses delay cyclic delay diversity (CDD) across the plurality of TRPs.

14. The method of claim 1, wherein the transparent transmit diversity scheme uses precoder cycling across the plurality of TRPs.

15. The method of claim 1, wherein the non-transparent transmit diversity scheme uses space-frequency block code (SFBC) across the plurality of TRPs.

16. The method of claim 1, wherein the non-transparent transmit diversity scheme uses space-time block code (STBC) across the plurality of TRPs.

17. The method of claim 1, wherein, when the UE is to receive non-coherent transmissions across the plurality of TRPs according to the non-transparent transmit diversity scheme, the CSI feedback identifies a plurality of ranks and a plurality of precoders selected by the UE,
wherein each rank, of the plurality of ranks, is associated with a respective hypothesis of the plurality of hypotheses, and
wherein each precoder, of the plurality of precoders, is associated with a respective hypothesis of the plurality of hypotheses.

18. The method of claim 1, wherein the non-transparent transmit diversity scheme uses a delay cyclic delay diversity (CDD) across the plurality of TRPs.

19. The method of claim 18, wherein the non-transparent transmit diversity scheme that uses the delay CDD is applied when different transport blocks are to be transmitted by the plurality of TRPs.

20. The method of claim 1, wherein a block diagonal precoder, associated with the closed-loop block diagonal precoder scheme, is selected from a preconfigured set of precoders, a preconfigured set of delay diversities, or a preconfigured set of phase shift diversities.

21. The method of claim 1, wherein, when the UE is to receive non-coherent transmissions across the plurality of TRPs according to the closed-loop block diagonal precoder scheme, the CSI feedback includes information that identifies a block diagonal precoder selected by the UE.

22. A user equipment (UE) for wireless communication, comprising:
a memory; and
one or more processors operatively coupled to the memory, the memory and the one or more processors configured to:
determine, based at least in part on a set of channel state information reference signals (CSI-RSs), a plurality of hypotheses associated with a plurality of transmission/reception points (TRPs),
wherein the UE is configured to receive non-coherent transmissions across the plurality of TRPs according to at least one of:
a transparent transmit diversity scheme,
a non-transparent transmit diversity scheme, or
a closed-loop block diagonal precoder scheme,
wherein a coherent precoder is configured within each of the plurality of TRPs, and
wherein the UE is configured to receive information associated with transparent precoding, to be applied by a TRP of the plurality of TRPs, based at least in part on transparent precoding not being applied to a CSI-RS of the set of CSI-RSs; and
determine, based at least in part on the plurality of hypotheses, channel state information (CSI) feedback associated with the plurality of TRPs.

23. The UE of claim 22, wherein the CSI feedback is provided to one or more of the plurality of TRPs.

24. The UE of claim 22, wherein the plurality of hypotheses includes a hypothesis associated with a joint transmission in which a same set of symbols is transmitted by each of the plurality of TRPs.

25. The UE of claim 22,
wherein at least two hypotheses, of the plurality of hypotheses, are determined based at least in part on the CSI-RS, and
wherein the CSI-RS is received from the TRP.

26. The UE of claim 22, wherein each of the plurality of hypotheses is determined based at least in part on a different CSI-RS of the set of CSI-RSs.

27. A non-transitory computer-readable medium storing one or more instructions for wireless communication, the one or more instructions comprising:
one or more instructions that, when executed by one or more processors of a user equipment (UE), cause the one or more processors to:
determine, based at least in part on a set of channel state information reference signals (CSI-RSs), a plurality of hypotheses associated with a plurality of transmission/reception points (TRPs),
wherein the UE is configured to receive non-coherent transmissions across the plurality of TRPs according to at least one of:
a transparent transmit diversity scheme,
a non-transparent transmit diversity scheme, or
a closed-loop block diagonal precoder scheme,
wherein a coherent precoder is configured within each of the plurality of TRPs, and
wherein the UE is configured to receive information associated with transparent precoding, to be applied by a TRP of the plurality of TRPs, based at least in part on transparent precoding not being applied to a CSI-RS of the set of CSI-RSs; and
determine, based at least in part on the plurality of hypotheses, channel state information (CSI) feedback associated with the plurality of TRPs.

28. An apparatus for wireless communication, comprising:
means for determining, based at least in part on a set of channel state information reference signals (CSI-RSs), a plurality of hypotheses associated with a plurality of transmission/reception points (TRPs),
wherein the apparatus is configured to receive non-coherent transmissions across the plurality of TRPs according to at least one of:
a transparent transmit diversity scheme,
a non-transparent transmit diversity scheme, or
a closed-loop block diagonal precoder scheme,
wherein a coherent precoder is configured within each of the plurality of TRPs, and wherein the apparatus is configured to receive information associated with transparent precoding, to be applied by a TRP of the plurality of TRPs, based at least in part on transparent precoding not being applied to a CSI-RS of the set of CSI-RSs; and means for determining, based at least in part on the plurality of hypotheses, channel state information (CSI) feedback associated with the plurality of TRPs.

29. The apparatus of claim 28, wherein at least two hypotheses, of the plurality of hypotheses, are determined based at least in part on the CSI-RS, and wherein the CSI-RS is received from the TRP.

30. The apparatus of claim 29, wherein the transparent precoding is not applied to the CSI-RS before the CSI-RS is transmitted to the apparatus by the TRP.

* * * * *